(12) United States Patent
Fraley (10) Patent No.: US 11,060,326 B2
(45) Date of Patent: Jul. 13, 2021

(54) DOOR LATCH ASSEMBLIES FOR VEHICLES INCLUDING LATCH RELEASE LEVER BLOCKING STRUCTURES

(71) Applicant: Toyota Motor Engineering & Manufacturing North America, Inc., Plano, TX (US)

(72) Inventor: Josh D. Fraley, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 622 days.

(21) Appl. No.: 15/923,444

(22) Filed: Mar. 16, 2018

(65) Prior Publication Data

US 2019/0284845 A1    Sep. 19, 2019

(51) Int. Cl.
*E05B 77/04* (2014.01)
*E05B 77/06* (2014.01)
(Continued)

(52) U.S. Cl.
CPC .............. *E05B 77/04* (2013.01); *B60J 5/04* (2013.01); *E05B 77/06* (2013.01); *E05B 83/40* (2013.01); *E05B 85/10* (2013.01); *E05B 79/20* (2013.01)

(58) Field of Classification Search
CPC .......... E05B 77/02; E05B 77/04; E05B 77/06; E05B 77/245; E05B 15/022;
(Continued)

(56) References Cited

U.S. PATENT DOCUMENTS

| 4,382,622 | A | * | 5/1983 | Ishikawa | ............... | E05B 77/12 |
| | | | | | | 292/216 |
| 4,995,654 | A | * | 2/1991 | Nishigami | ............. | E05B 77/12 |
| | | | | | | 292/216 |

(Continued)

FOREIGN PATENT DOCUMENTS

| FR | 2869340 | A1 | * | 10/2005 | ............. | E05B 77/04 |
| JP | 4099745 | B2 | | 6/2008 | | |

(Continued)

OTHER PUBLICATIONS

Machine Translation of FR 2869340 A1, 2020, pp. 1-12 (Year: 2020).*

*Primary Examiner* — Christine M Mills
(74) *Attorney, Agent, or Firm* — Dinsmore & Shohl LLP (57) ABSTRACT

A door latch assembly includes a door handle, a latch release lever operatively coupled to the door handle and having a plane of rotation, and a latch release lever blocking structure operable to block rotation of the latch release lever through the plane of rotation. The latch release lever blocking structure includes a bracket body and a catch arm extending from the bracket body to a catch end. The latch release lever blocking structure is spaced from the plane of rotation of the latch release lever during normal operating conditions. The latch release lever blocking structure is configured to deform in the vehicle longitudinal direction when acted upon by an impact force such that the catch arm moves into the plane of rotation of the latch release lever and the catch end catches the latch release lever to prevent the latch release lever from rotating to an unlatched position.

21 Claims, 8 Drawing Sheets

(51) Int. Cl.
*E05B 83/40* (2014.01)
*B60J 5/04* (2006.01)
*E05B 85/10* (2014.01)
*E05B 79/20* (2014.01)

(58) Field of Classification Search
CPC .... Y10S 292/22; Y10S 292/65; Y10T 292/03; Y10T 292/57; Y10T 292/0908; Y10T 292/1047; Y10T 292/17; B60J 5/0461
USPC .... 292/DIG. 22, DIG. 65, 1, 336.3, 92, 216, 292/253; 296/187.12
See application file for complete search history.

(56) References Cited

U.S. PATENT DOCUMENTS

| | | | | |
|---|---|---|---|---|
| 5,813,709 | A * | 9/1998 | Umino | E05B 83/36 292/216 |
| 5,842,728 | A * | 12/1998 | Umino | E05B 77/02 292/216 |
| 6,065,797 | A * | 5/2000 | Shirasaka | E05B 77/12 292/DIG. 65 |
| 6,880,867 | B2 * | 4/2005 | Schoen | E05B 77/06 292/216 |
| 7,111,880 | B2 * | 9/2006 | Saitoh | E05B 77/04 292/336.3 |
| 7,648,192 | B2 * | 1/2010 | Herline | E05B 77/04 296/187.12 |
| 8,079,631 | B2 * | 12/2011 | Higgins | E05B 77/04 296/146.1 |
| 8,128,151 | B2 * | 3/2012 | Teramoto | E05B 77/04 296/146.1 |
| 8,235,451 | B2 * | 8/2012 | Jordan | E05B 83/36 296/146.1 |
| 8,360,486 | B2 * | 1/2013 | Gschweng | E05B 17/0062 292/336.3 |
| 8,387,311 | B2 * | 3/2013 | Heller | B60J 5/0451 49/503 |
| 8,414,038 | B2 * | 4/2013 | Bedekar | E05B 77/04 292/216 |
| 8,465,064 | B2 * | 6/2013 | Ghannam | E05B 79/12 292/336.3 |
| 8,701,817 | B2 * | 4/2014 | Schoen | E05B 79/12 180/281 |
| 8,727,399 | B2 * | 5/2014 | Russell | E05B 77/06 292/216 |
| 8,727,402 | B2 * | 5/2014 | Bejune | E05B 77/06 292/336.3 |
| 8,801,055 | B2 * | 8/2014 | Muramatsu | E05B 53/00 292/336.3 |
| 8,833,812 | B2 * | 9/2014 | Sakai | E05B 77/04 292/336.3 |
| 8,955,257 | B2 * | 2/2015 | Moriya | B60J 5/0425 49/502 |
| 9,045,917 | B2 * | 6/2015 | Gschweng | E05B 85/10 |
| 9,534,424 | B2 * | 1/2017 | Bendel | E05B 77/06 |
| 9,567,769 | B2 * | 2/2017 | Zimmer | E05B 77/04 |
| 9,605,449 | B2 * | 3/2017 | Rosales | E05B 77/04 |
| 9,617,759 | B2 * | 4/2017 | Kang | E05B 85/16 |
| 9,631,402 | B2 * | 4/2017 | Bejune | E05B 17/0062 |
| 9,752,355 | B2 * | 9/2017 | Nagaoka | E05B 77/04 |
| 10,260,259 | B2 * | 4/2019 | Nagata | E05B 85/16 |
| 10,287,805 | B2 * | 5/2019 | Faust | E05C 3/12 |
| 10,526,817 | B2 * | 1/2020 | Gray | E05B 83/40 |
| 10,689,887 | B2 * | 6/2020 | Gray | E05B 77/04 |
| 2015/0167358 | A1 * | 6/2015 | Bejune | E05B 77/04 292/195 |
| 2016/0097223 | A1 * | 4/2016 | Rosales | E05B 77/12 292/92 |
| 2016/0108645 | A1 * | 4/2016 | Kim | E05B 77/04 292/336.3 |
| 2016/0168882 | A1 * | 6/2016 | Chung | E05B 79/20 292/92 |
| 2019/0284845 | A1 * | 9/2019 | Fraley | E05B 83/40 |
| 2019/0301208 | A1 * | 10/2019 | Cimpean | E05B 77/06 |

FOREIGN PATENT DOCUMENTS

| | | |
|---|---|---|
| JP | 5064199 B2 | 10/2012 |
| KR | 100811714 B1 | 3/2008 |

* cited by examiner

DOOR LATCH ASSEMBLIES FOR VEHICLES INCLUDING LATCH RELEASE LEVER BLOCKING STRUCTURES

TECHNICAL FIELD

The present specification generally relates to door latch assemblies for vehicles and, more specifically, to door latch assemblies including latch release lever blocking structures.

BACKGROUND

Door latch assemblies for vehicles may be provided and are used to latch a vehicle door, such as a driver side door or a passenger side door in a closed position. The door latch assemblies may include a door latch device within the vehicle door that can engage a cooperating structure, such as a striker that is located on a frame of the vehicle. The vehicle door may remain in the closed position until a vehicle occupant actuates a door handle, which then opens the door latch device.

For some side impact tests, vehicle door structures may move inboard, which may affect operation of the door latch assemblies. Accordingly, a need exists for alternative blocking structures that can block unintended actuation of the door latch assemblies under certain side impact conditions.

SUMMARY

In one embodiment, a door latch assembly for latching and unlatching a vehicle door assembly includes a door handle, a latch release lever operatively coupled to the door handle and having a plane of rotation, and a latch release lever blocking structure operable to block rotation of the latch release lever through the plane of rotation. Rotation of the door handle causes the latch release lever to travel through the plane of rotation to unlatch the vehicle door assembly. The latch release lever blocking structure includes a bracket body and a catch arm extending from the bracket body to a catch end along a vehicle longitudinal direction. The latch release lever blocking structure is longitudinally spaced from the plane of rotation of the latch release lever during normal operating conditions. The latch release lever blocking structure is configured to deform in the vehicle longitudinal direction when acted upon by an impact force such that the catch arm moves into the plane of rotation of the latch release lever and the catch end catches the latch release lever at a location spaced from the bracket body to prevent the latch release lever from rotating to an unlatched position.

In another embodiment, a vehicle door assembly includes an outer door panel and a door latch assembly operable to latch and unlatch the vehicle door assembly. The door latch assembly includes a door handle, a latch release lever operatively coupled to the door handle and having a plane of rotation, and a latch release lever blocking structure positioned inboard of the outer door panel and operable to block rotation of the latch release lever through the plane of rotation. Rotation of the door handle causes the latch release lever to travel through the plane of rotation to unlatch the vehicle door assembly. The latch release lever blocking structure includes a bracket body and a catch arm extending from the bracket body to a catch end along a vehicle longitudinal direction. The latch release lever blocking structure is longitudinally spaced from the plane of rotation of the latch release lever during normal operating conditions. The latch release lever blocking structure is configured to deform in the vehicle longitudinal direction when acted upon by an impact force such that the catch arm moves into the plane of rotation of the latch release lever and the catch end catches the latch release lever at a location spaced from the bracket body to prevent the latch release lever from rotating to an unlatched position.

In yet another embodiment, a vehicle includes a body and a vehicle door assembly coupled to the body. The vehicle door assembly includes an outer door panel and a door latch assembly operable to latch and unlatch the vehicle door assembly. The door latch assembly includes a door handle, a latch release lever operatively coupled to the door handle and having a plane of rotation, and a latch release lever blocking structure positioned inboard of the outer door panel and operable to block rotation of the latch release lever through the plane of rotation. Rotation of the door handle causes the latch release lever to travel through the plane of rotation to unlatch the vehicle door assembly. The latch release lever blocking structure includes a bracket body and a catch arm extending from the bracket body to a catch end along a vehicle longitudinal direction. The latch release lever blocking structure is longitudinally spaced from the plane of rotation of the latch release lever during normal operating conditions. The latch release lever blocking structure is configured to deform in the vehicle longitudinal direction when acted upon by an impact force such that the catch arm moves into the plane of rotation of the latch release lever and the catch end catches the latch release lever at a location spaced from the bracket body to prevent the latch release lever from rotating to an unlatched position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles including vehicle door assemblies that include door latch assemblies. The door latch assemblies are used to latch the vehicle door assemblies in a closed position. The door latch assemblies include a latch that may be located within the vehicle door assemblies. The latch can engage a cooperating structure, such as a striker, to hold the vehicle door assembly in the closed position until a vehicle door handle assembly is operated. The door handle assembly may be operatively connected to the latch using a latch release lever. That is, the latch release lever may be part of the connection between the door handle assembly and the latch. During certain side impact conditions, vehicle door structures within the vehicle door assemblies can move inboard and other directions. Movement of the vehicle door structures can include the latch release lever. To inhibit unintended movement of the latch release lever, a latch release lever blocking structure is provided. The latch release lever blocking structure is provided to move into a plane of rotation of the latch release lever under certain side impact conditions where the latch release lever blocking structure is moved due to an external force applied to the vehicle door assembly. The latch release lever blocking structure is moved into the plane of rotation of the latch release lever to prevent unintended movement of the latch release lever that may affect operation of the latch.

Figure 1:
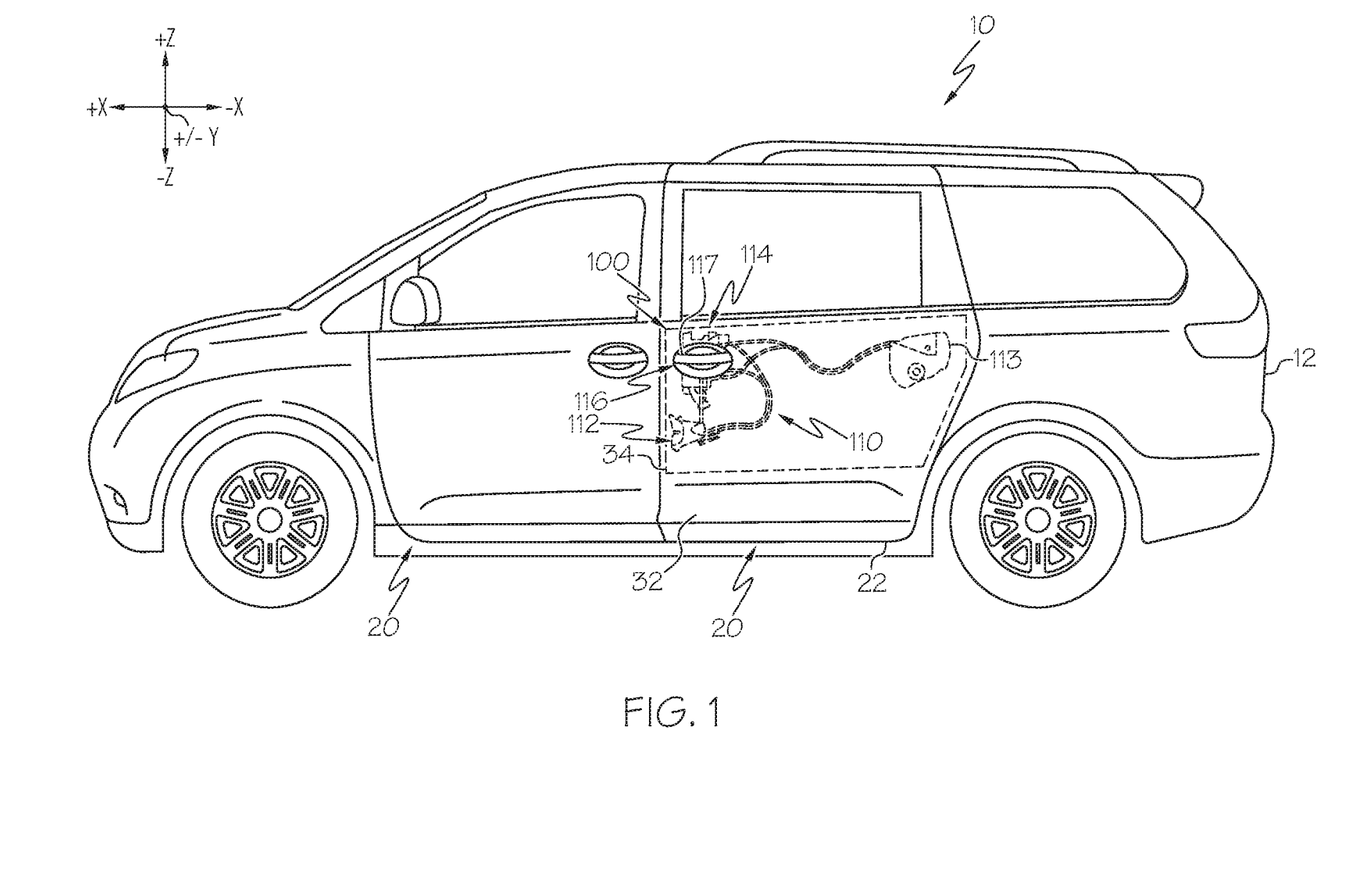
FIG. 1 depicts a side view of a vehicle, according to one or more embodiments shown and described herein.

As used herein, the term "vehicle longitudinal direction" refers to the forward-rearward direction of the vehicle 10 (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Figure 2:
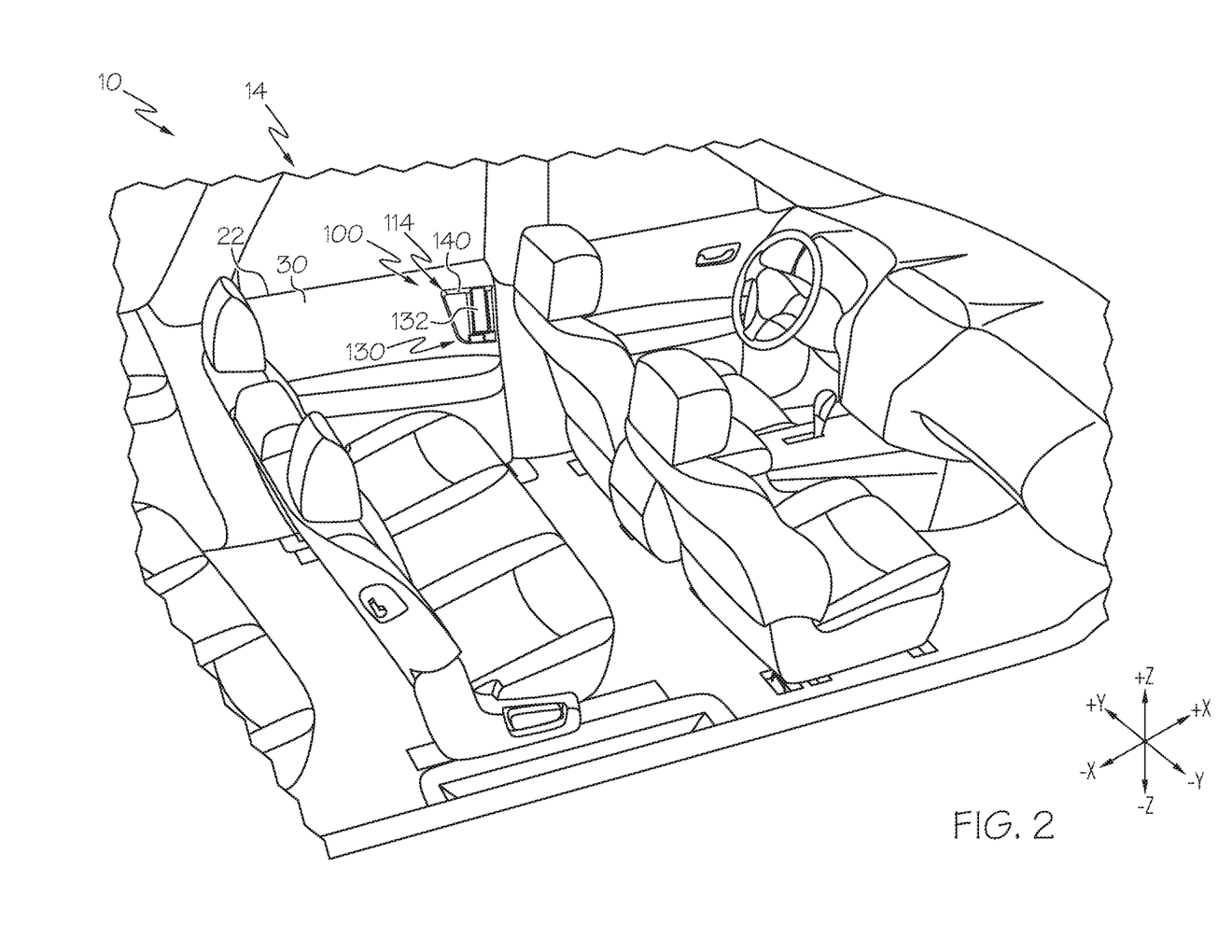
FIG. 2 depicts an interior of the vehicle of FIG. 1, according to one or more embodiments shown and described herein.

Referring now to FIG. 1, a vehicle 10 according to various embodiments is illustrated. It is noted that while the vehicle 10 is depicted as a passenger van, the vehicle 10 may be any passenger vehicle 10 such as, for example, a terrestrial, aquatic, and/or airborne vehicle. The vehicle 10 includes a body 12 characterizing a frame of the vehicle 10. As shown in FIG. 2, the body 12 of the vehicle 10 defines an interior passenger compartment 14.

The vehicle 10 includes a number of door assemblies 20 enclosing the interior of the vehicle 10. Each door assembly 20 is slidingly, pivotally, or otherwise connected to the body 12 of the vehicle 10 such that the door assembly 20 is capable of moving between a closed position and an open position. In particular, a rear passenger door assembly 22 may be slidingly connected to the body 12 of the vehicle 10, such as is found on many passenger vans. It is noted that while the remaining description will focus on latch assemblies 100 as part of a sliding rear passenger door assembly 22, similar latch assemblies 100 may be utilized in swinging or hingedly coupled passenger and driver doors.

Referring collectively to FIGS. 1 and 2, the rear passenger door assembly 22 is constructed from rigidly interconnected door frame members and door panels, as well as any combination of overlying panels, trim, upholstery and other door coverings. The door panels include an upright inner door panel 30 and an upright outer door panel 32 (shown in FIG. 1). In some embodiments, there may be additional outer and/or inner door panels. The inner door panel 30 and the outer door panel 32 are spaced apart from one another in the vehicle lateral direction. As a result, the rear passenger door assembly 22 has an interior door cavity 34 (shown in FIG. 1) defined between the inner door panel 30 and the outer door panel 32.

Figure 3:
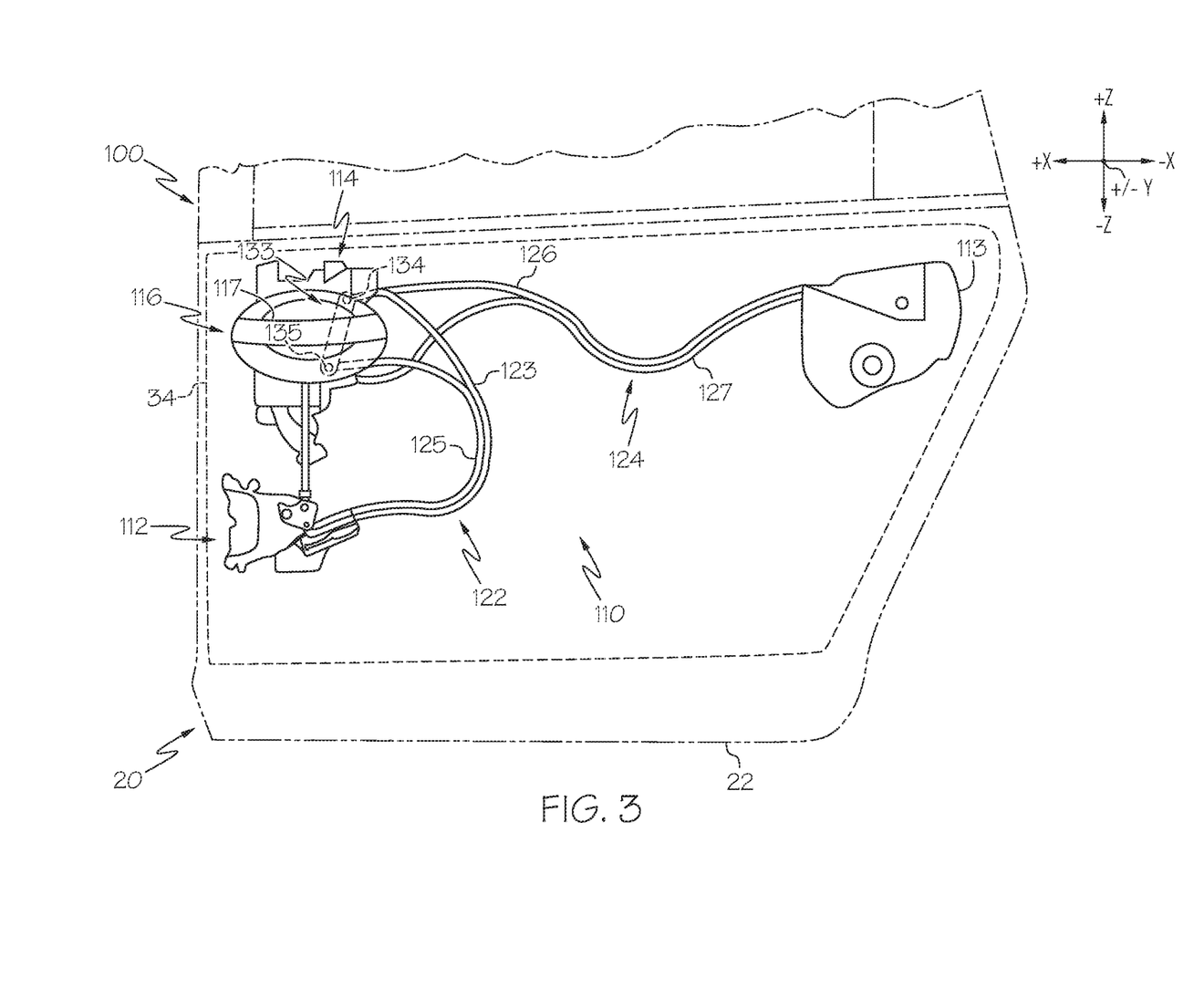
FIG. 3 depicts a door assembly of the vehicle of FIG. 1 with a door latch assembly, according to one or more embodiments shown and described herein.

The interior door cavity 34 can house various components of the rear passenger door assembly 22. In particular, the interior door cavity 34 houses a portion of the door latch assembly 100 schematically illustrated by dashed lines in FIG. 1. Referring also to FIG. 3, which further illustrates the door latch assembly 100, the door latch assembly 100 operates to latch and unlatch the rear passenger door assembly 22. The door latch assembly 100 includes one or more latching mechanisms (e.g., front latching mechanism 112, rear latching mechanism 113) operable to latch the rear passenger door assembly 22 to the body 12 of the vehicle 10, a door handle assembly 114 that is operatively coupled to the one or more latching mechanisms, and a linking system 110 which operatively couples the door handle assembly 114 to the one or more latching mechanisms such that rotation 138 of a handle (e.g., exterior door handle 117 and interior door handle 132) of the door handle assembly 114 causes the one or more latching mechanisms to unlatch the rear passenger door assembly 22.

For example, referring again to FIGS. 2 and 3, the door handle assembly 114 includes an exterior handle assembly 116 and an interior handle assembly 130. Exterior and interior handle assemblies 116, 130 are rigidly mounted to the rear passenger door assembly 22 as a unitary module. For example, the exterior handle assembly 116 is rigidly mounted to the exterior door panel 32 and the interior handle assembly 130 is rigidly mounted to the interior door panel 30. Each of the exterior and interior handle assemblies 116, 130 may be located at the upper-front quadrant of the rear passenger door assembly 22. Each of the exterior handle assembly 116 and the interior handle assembly 130 have a door handle 117, 132 operably coupled to the one or more latching mechanisms so as to be able to disengage the one or more latching mechanisms to cause the rear passenger door assembly 22 to open.

Each of the one or more latching mechanisms may be rigidly mounted within the interior door cavity 34. In one embodiment, the door latch assembly 100 includes a front latching mechanism 112, positioned toward a front portion of the rear passenger door assembly 22 in the vehicle longitudinal direction, and a rear latching mechanism 113, positioned toward a rear portion of the rear passenger door assembly 22 in the vehicle longitudinal direction. For example, the front latching mechanism 112 may be positioned in a front lower quadrant of the rear passenger door assembly 22 and the rear latching mechanism 113 may be positioned in a rear upper quadrant of the rear passenger door assembly 22. However, it is contemplated that the front and rear latching mechanisms 112, 113 may be positioned anywhere within the rear passenger door assembly 22 that is suitable for latching the rear passenger door assembly 22 in the closed position. The front and rear latching mechanisms 112, 113 are operable to move a latch from a latched position where it is coupled to the body 12 of the vehicle 10, wherein the rear passenger door assembly 22 is unable to move relative to the body 12 of the vehicle 10, to an unlatched position, wherein the rear passenger door assembly 22 is free to move relative to the body 12 of the vehicle 10. In some embodiments, there may be latching mechanisms in addition to the front and rear latching mechanisms 112, 113.

The linking system 110 operatively couples the door handle assembly 114 to the one or more latching mechanisms so as to allow a user to unlatch the vehicle door assembly 20 by operating a door handle (e.g., exterior door handle 117 shown in FIG. 2 and/or interior door handle 132 shown in FIG. 3) of the door handle assembly 114. The linking system 110 may include various rods, cables, levers, and the like to operate the one or more latching mechanisms. For example, the linking system 110 includes a latch release lever 133 located within the door handle assembly 114. One or more cables (e.g., front latch cables 122, rear latch cables 124) may extend from latch release lever 133 to the front and rear latching mechanisms 112, 113, such that rotation 138 of the latch release lever 133 operates the front and rear latching mechanisms 112, 113. For example, the linking system 110 includes front latch cables 122 having a first cable 123 extending from a first end 134 of the latch release lever 133 and a second cable 125 extending from a second end 135 of the latch release lever 133 to the front latching mechanism 112. The linking system 110 may further include rear latch cables 124 having a first cable 126 extending from the first end 134 of the latch release lever 133 and a second cable 127 extending from the second end 135 of the latch release lever 133. The front and rear latch cables 122, 124 can be operatively coupled to a latch within the front and rear latching mechanisms 112, 113 to latch and unlatch the front and rear latching mechanisms 112, 113 when the latch release lever 133 is rotated.

Accordingly, under normal operating conditions, a handle (e.g., exterior door handle 117 shown in FIG. 2 and/or interior door handle 132 shown in FIG. 3) of the door handle assembly 114 is actuated by a user. The handle is operatively coupled to the latch release lever 133 such that actuation of the handle of the door handle assembly 114 causes the latch release lever 133 to rotate through a plane of rotation to unlatch the vehicle door assembly 20. More specifically, the rotational movement of the latch release lever 133 through its plane of rotation 138 pulls the front and rear latch cables 122, 124 which cause the front and rear latching mechanisms 112, 113 to unlatch the rear passenger door assembly 22.

Referring specifically to the interior handle assembly 130 of FIG. 2, the interior handle assembly 130 includes a handle bezel 140 by which the interior handle assembly 130 is rigidly mounted to the rear passenger door assembly 22 and which houses and supports movement of the door handle 132. The handle bezel 140 may extend from the inner door panel 30 into the interior door cavity 34, such that the door handle 132 is at least partially sunken within the rear passenger door assembly 22. The handle bezel 140 may be made of any suitable material and produced by any conventional forming techniques (e.g., injection molded plastic). It is noted that, though the handle bezel 140 is illustrated as having a particular shape, the handle bezel 140 can be any shape that is operable to house at least a portion of the door handle 132 and support movement of the door handle 132 to open the rear passenger door assembly 22. The handle bezel 140 may couple to the inner door panel 30 of the rear passenger door assembly 22 through any conventional coupling techniques including, fasteners, adhesives, interlocking components that "snap" together, and the like.

Figure 4:
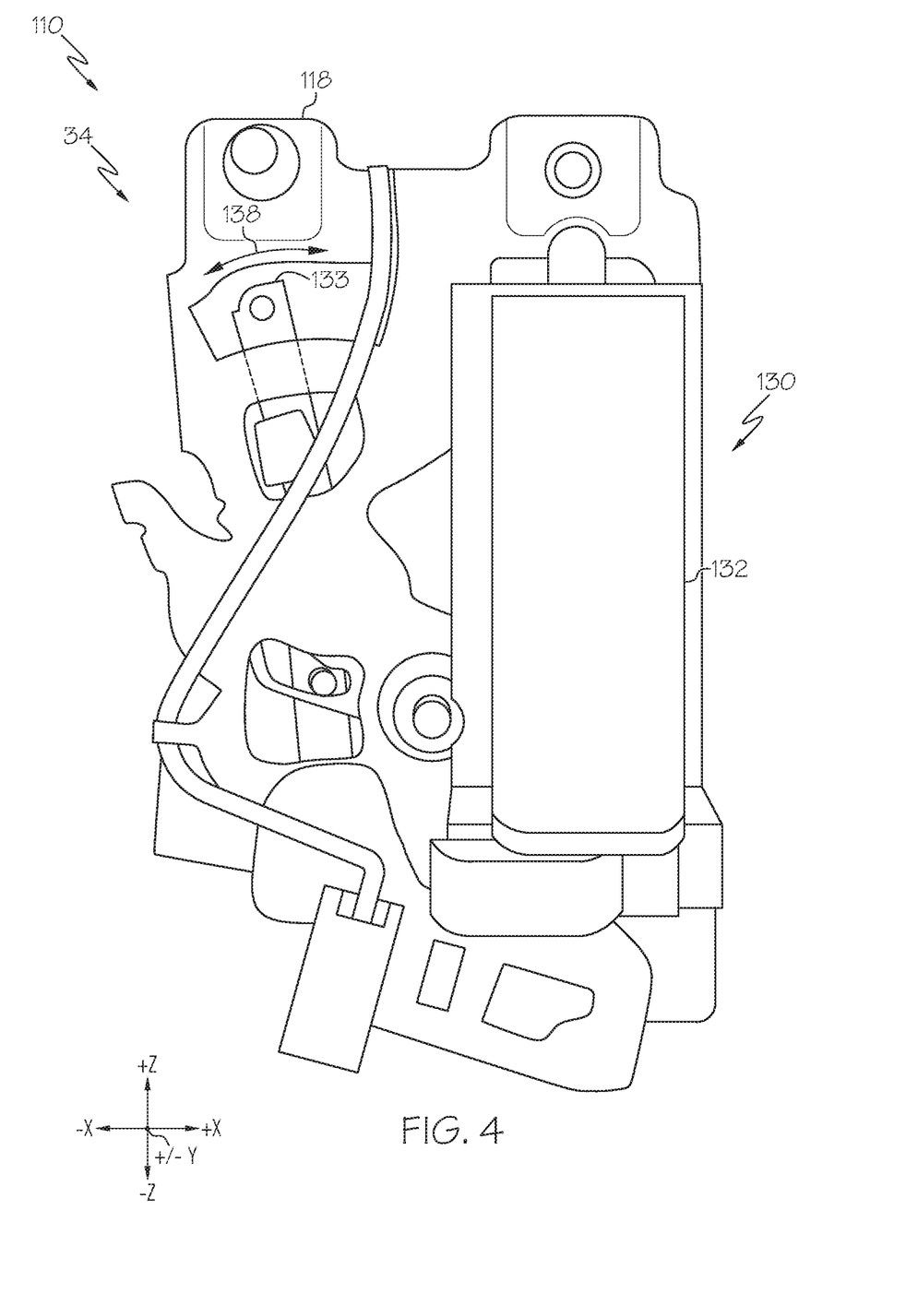
FIG. 4 depicts an interior handle of the vehicle of FIG. 1 mounted on a support structure, according to one or more embodiments shown and described herein.

FIG. 4 illustrates the interior handle assembly 130 of the vehicle 10 with the inner door panel 30 and the handle bezel 140 removed. As illustrated, the interior handle 132 of the interior handle assembly 130 is rotatively coupled to an inboard side of a handle base plate 118 within the interior door cavity 34. The handle base plate 118 may provide a support structure for at least some of the components housed within the interior door cavity 34. For example, the latch release lever 133, which is viewable through an opening 119 in the handle base plate 118, may be rotatively supported on the handle base plate 118 such that the latch release lever 133 may move through a plane of rotation 138 between a latched and unlatched position. Movement of the latch release lever 133 through its plane of rotation 138 in the +X direction, as indicated in the depicted coordinate axes, may cause the front and rear latching mechanisms 112, 113 shown in FIG. 3 to unlatch. Whereas movement of the of the latch release lever 133 through its plane of rotation 138 back in the −X direction, causes the front and rear latching mechanisms 112, 113 to re-latch the rear passenger door assembly 22 to the body 12 of the vehicle 10. It is noted that in embodiments, the door latch assembly 100 is biased to a latched orientation.

Figure 5:
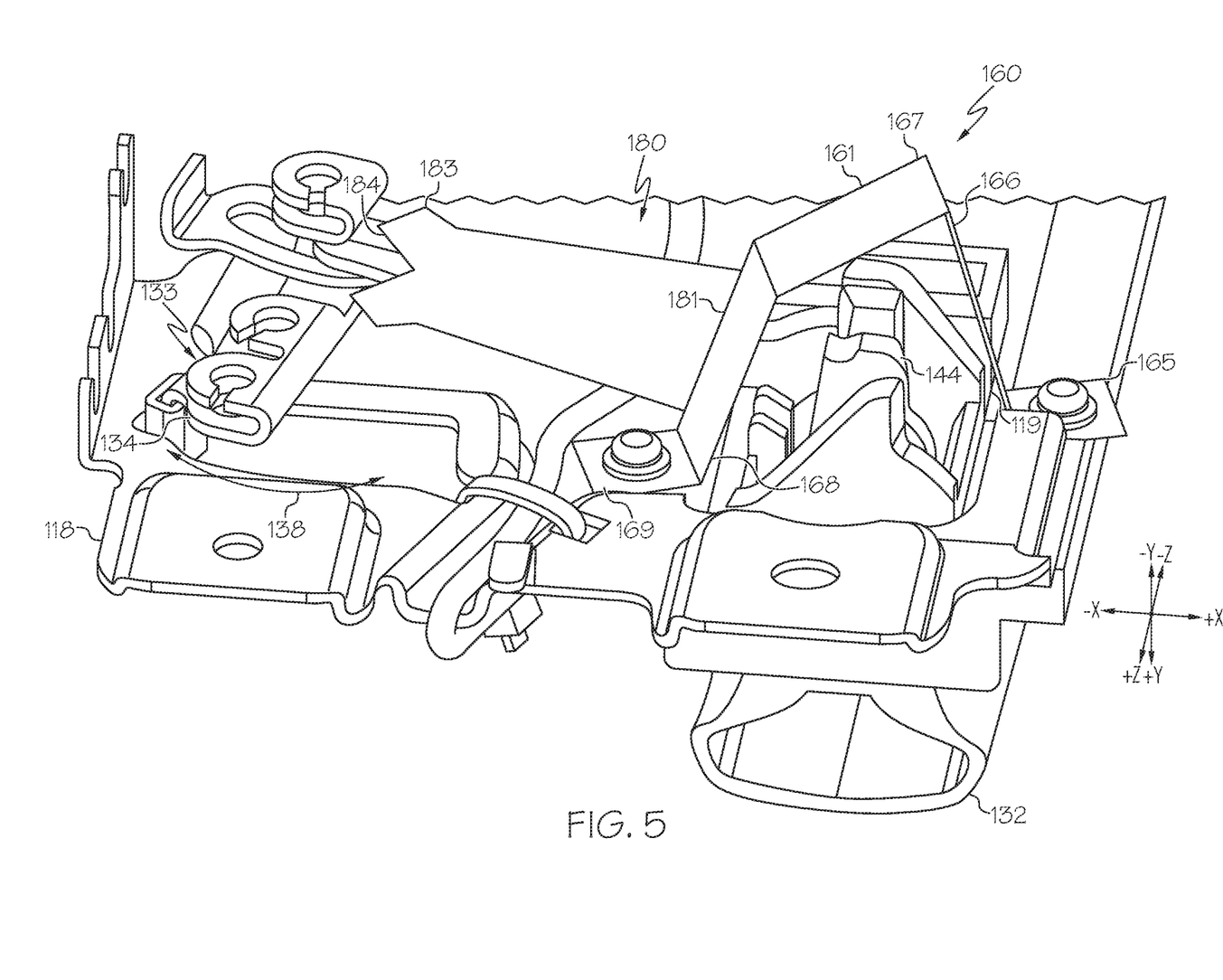
FIG. 5 depicts a perspective view of an exterior facing side of the support structure of FIG. 4, according to one or more embodiments shown and described herein.

FIG. 5 illustrates a perspective view of the outboard side of the handle base plate 118. As shown, the interior door handle 132 includes one or more handle levers 144 that extend through an opening 119 in the handle base plate 118. The first end 134 of the latch release lever 133 is also shown. As noted above, during certain side impact conditions, the latch release lever 133 may be unintentionally shifted through its plane of rotation 138 in the +X direction of the coordinate axes depicted in the figures and into an unlatched position. Accordingly, the rear passenger door assembly 22 can be inadvertently unlatched, allowing the rear passenger door assembly 22 to open.

In order to prevent this unintentional unlatching of the rear passenger door assembly 22, a latch release lever blocking structure 160 is provided. The latch release lever blocking structure 160 is operable to prevent rotation of the latch release lever 133 through its plane of rotation 138 during certain side impact conditions. For example, the latch release lever blocking structure 160 may be a deformable bracket configured to deform longitudinally into the plane of rotation 138 of the latch release lever 133 to prevent the latch release lever 133 from moving into the unlatching position.

The latch release lever blocking structure 160 includes a bracket body 161 and a catch arm 180 extending from the bracket body 161 to a catch end 183 in the vehicle longitudinal direction. The latch release lever blocking structure 160 is longitudinally spaced from the plane of rotation 138 of the latch release lever 133 during normal operating conditions. However the latch release blocking structure is configured to deform in the vehicle longitudinal direction when acted upon by a predetermined force such that the catch arm 180 moves into the plane of rotation 138 of the latch release lever 133 and the catch end 183 catches the latch release lever 133 at a location spaced from the bracket body 161 to prevent the latch release lever 133 from rotating to an unlatched position. Accordingly, the latch release lever blocking structure 160 may be mounted to a support structure within the interior door cavity 34 proximate to the plane of rotation 138 of the latch release lever 133 so as to be longitudinally spaced from the plane of rotation 138 of the latch release lever 133.

As shown in FIG. 5, in some embodiments, the support structure to which the latch release lever blocking structure 160 is mounted is the handle base plate 118. For instance, the latch release lever blocking structure 160 may be mounted over and span a distance of the opening 119 in the handle base plate 118 through which handle lever 144 of the door handle 117 extends. Accordingly, the bracket body 161 of the latch release lever blocking structure 160 may provide clearance for the handle lever 144 of the door handle 117 to rotate under normal operating conditions. However, other support structures and/or mounting positions are possible and contemplated.

Figure 6A:
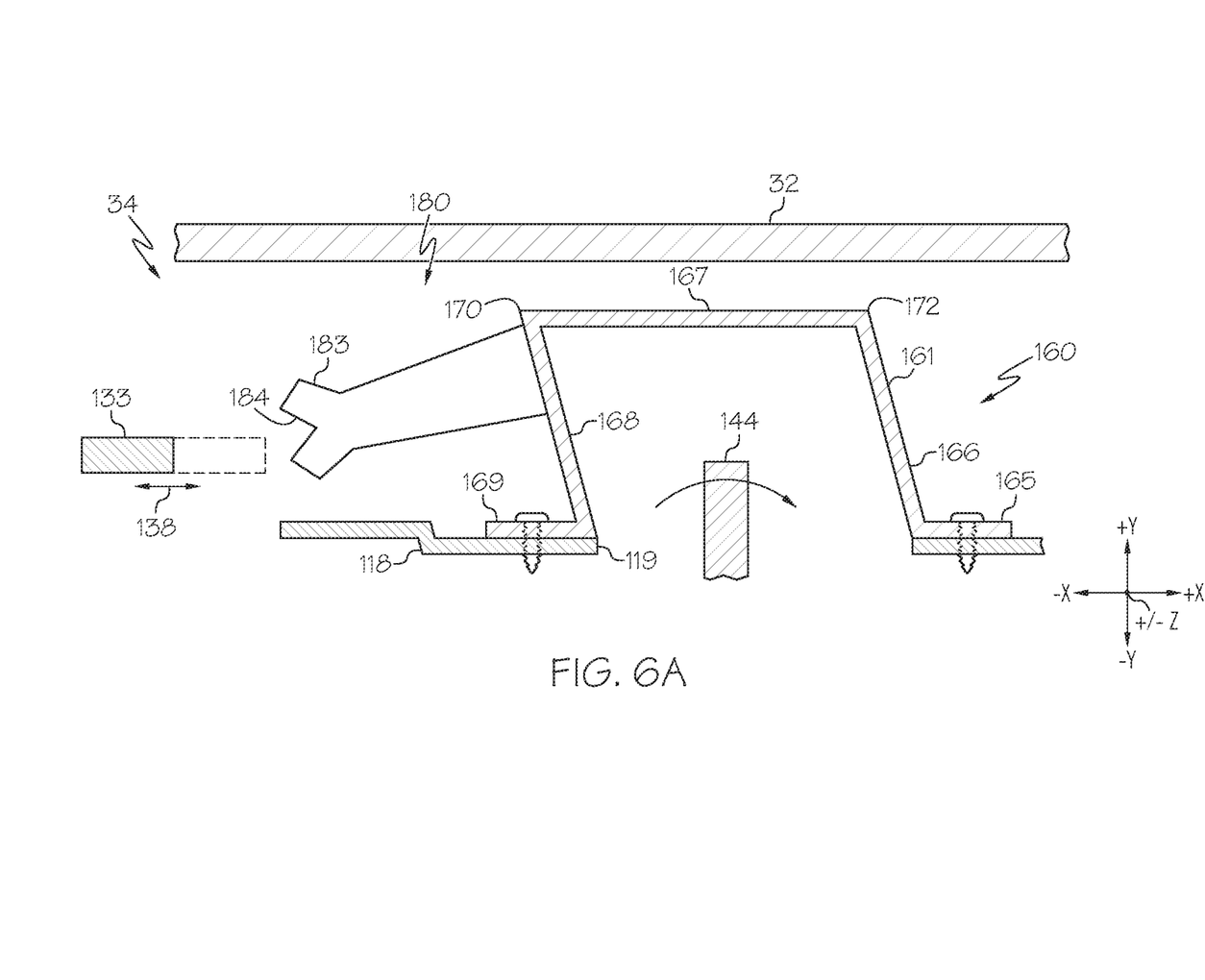
FIG. 6A depicts a release lever blocking structure, according to one or more embodiments shown and described herein.

FIG. 6A schematically illustrates a top view of the latch release lever blocking structure 160 during normal operating conditions within the interior door cavity 34 of the rear passenger door assembly 22. In some embodiments, the latch release lever blocking structure 160 includes a first leg 166, a second leg 168 longitudinally spaced from the first leg 166, and an overhang portion 167 bridging a distance between the first leg 166 and the second leg 168. Each of the first leg 166 and the second leg 168 may be connected to the overhang portion 167 by a bend 170 (e.g., bend 172 and bend 170 respectively).

The first leg 166 may be coupled to the handle base plate 118 on one side of the opening 119 and the second leg 168 may be coupled to the handle base plate 118 on a second side of the opening 119. For example, the first leg 166 may include a foot 165 that is fastened or otherwise coupled to the handle base plate 118. The second leg 168 may similarly include a foot 169 that is fastened or otherwise coupled to the handle base plate 118 opposite the foot 165 of the first leg 166. As shown, the first and second legs 166, 168 may extend from the handle base plate 118, so as to be tilted from the Y-axis in the depicted coordinate axes toward the plane of rotation 138 of the latch release lever 133 (e.g., in the −X direction). By tilting the first and second legs 166, 168 from the Y-axis toward the plane of rotation 138 of the latch release lever 133, the bracket body 161 may be predisposed to deform in the vehicle longitudinal direction toward the plane of rotation 138 of the latch release lever 133 when acted upon by a predetermined force.

Figure 7:
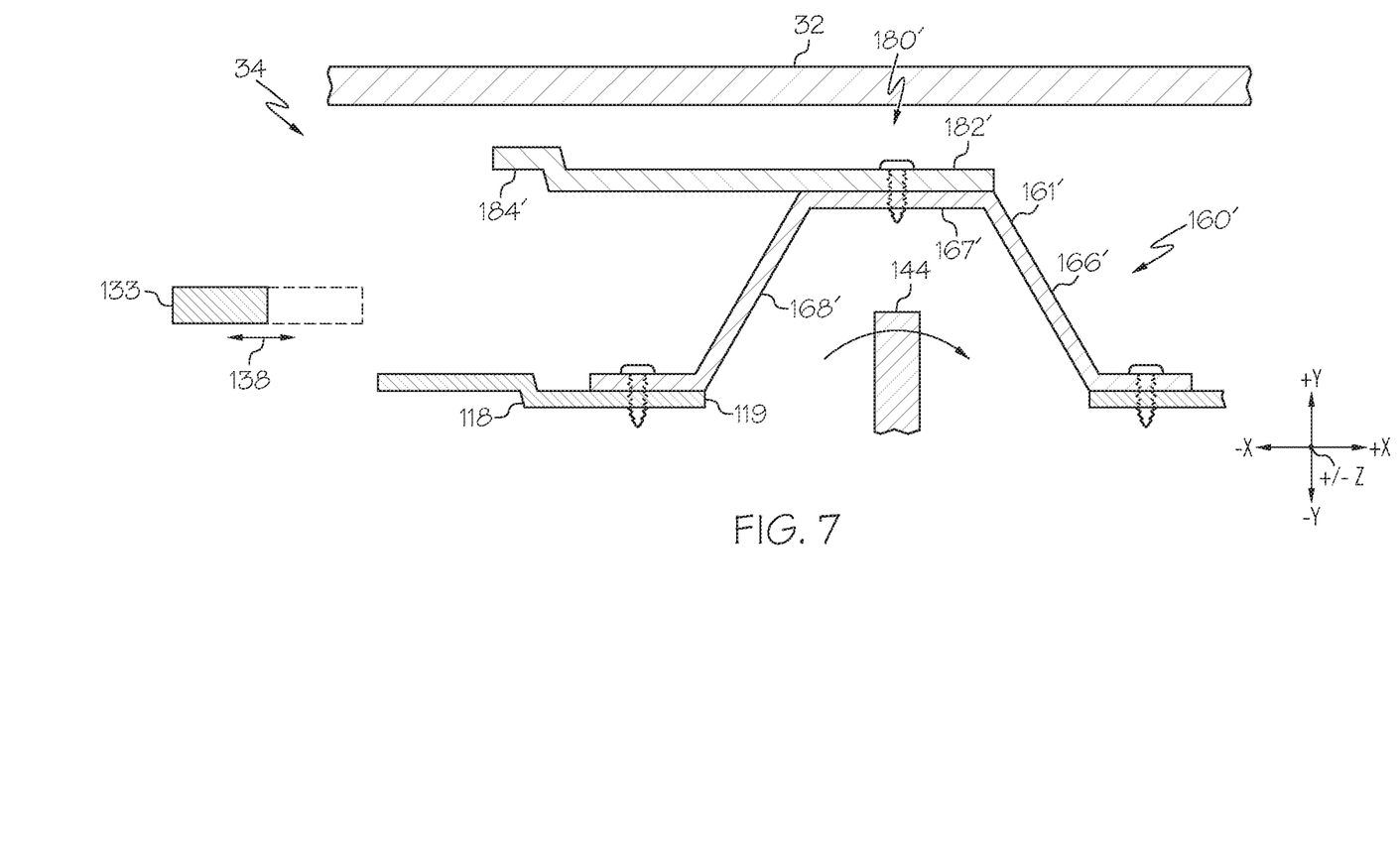
FIG. 7 depicts a release lever blocking structure, according to one or more embodiments shown and described herein.

In other embodiments, the first and second legs 166, 168 may not be tilted toward the plane of rotation 138 of the latch release lever 133. For example, FIG. 7 illustrates an alternative embodiment of the latch release lever blocking structure 160'. In this embodiment the first and second legs 166', 168', are tilted from the Y-axis in the depicted coordinate axes longitudinally toward one another. Other orientations are also possible and contemplated.

Figure 6B:
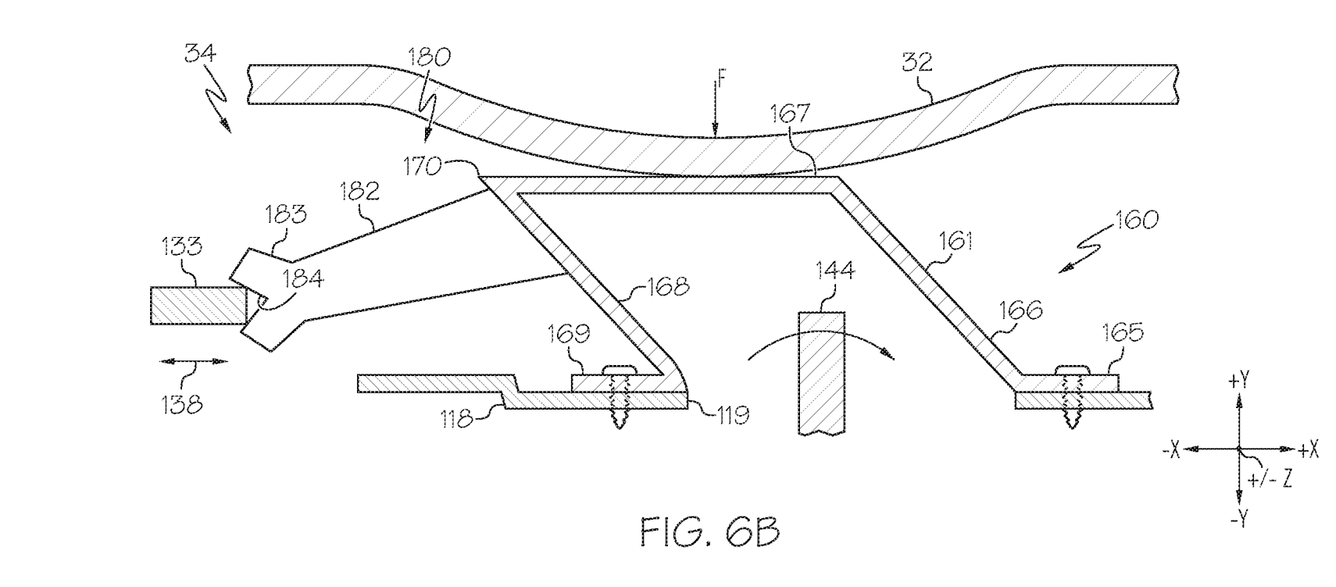
FIG. 6B depicts the release lever blocking structure of FIG. 6A experiencing deformation due to an impact force, according to one or more embodiments shown and described herein.

Referring again to FIG. 6A, the overhang portion 167 may be laterally spaced in the vehicle lateral direction (e.g., +Y direction) from the handle base plate 118 by the first and second legs 166, 168. As noted above, this spacing between the overhang portion 167 and the handle base plate 118 may provide clearance for a handle lever 144 of the door handle 132 to rotate during normal operating conditions. The overhang portion 167 is illustrated as being located adjacent to the outer door panel 32. Referring briefly to FIG. 6B, by locating the overhang portion 167 adjacent to the outer door panel 32, the outer door panel 32 may engage the overhang portion 167 during an impact that moves the outer door panel 32 in a vehicle lateral direction.

Referring again to FIG. 6A, the catch arm 180 may extend from one of the first leg 166 and the second leg 168 in the vehicle longitudinal direction. In the illustrated embodiment, the catch arm 180 extends from the second leg 168 in the vehicle longitudinal direction to the catch end 183.

Referring to FIG. 5, the catch end 183 may be connected to the second leg 168 by a bend 181. In some embodiments, the bracket body 161 also spaces the catch arm 180 beyond the plane of rotation 138 of the latch release lever 133 in the vehicle lateral direction. The catch end 183 may include a cutout 184 that is configured to receive or catch the latch release lever 133 therein when a predetermined force causes the catch arm 180 to move into the plane of rotation 138 of the latch release lever 133. For example, the cutout 184 may be a notch, a channel, or a cup cutout of the catch end 183. The cutout 184 may be positioned anywhere on the catch end 183 suitable for catching the latch release lever 133.

Referring again to the alternative embodiments of the latch release lever blocking structure 160' depicted in FIG. 7, the catch arm 180' may be a separate component coupled to the bracket body 161'. For example, the catch arm 180' may include a support portion 182 configured to be coupled to the overhang portion 167' of the bracket body 161' by fasteners or other suitable coupling techniques. The catch arm 180' may extend longitudinally beyond the overhang portion 167' toward the plane of rotation 138 of the latch release lever 133.

The latch release lever blocking structure 160 can be formed of any suitable material, such as metal, that allows for deformation of the latch release lever blocking structure 160 as described above. Further, other shapes for the latch release lever blocking structure 160 may be used other than that illustrated, such as a rounded shape, irregular shape, etc.

When a vehicle (e.g., vehicle 10) experiences an impact, vehicle structures may elastically and plastically deform while the vehicle slows from its previous operating speed. The impact diverts the energy associated with a moving vehicle into energy that deforms vehicle 10 structures. The vehicle structures may be designed to accommodate such impact events, such that the energy associated with the impact may be controllably dissipated through selective and preferential deformation of the vehicle structures.

When a vehicle experiences a side impact, energy may be received in the areas of the rear passenger door assembly 22 as represented by arrow F. As the door structures move inward in the vehicle lateral direction, they may impinge upon the door latch assembly 100. As noted herein, in order to inhibit unintended movement of the latch release lever 133 during such movement of the vehicle door structures, the latch release lever blocking structure 160 is provided.

Referring to FIG. 6B, the outer door panel 32 is illustrated moving inwardly in the vehicle lateral direction due to application of an impact force F, such as may be experienced during a side impact condition to a vehicle door assembly. As the outer door panel 32 moves, the outer door panel 32 may engage the overhang portion 167 of the latch release lever blocking structure 160. The outer door panel 32 may continue to move, which may cause the catch arm 180 to move toward the plane of rotation 138 of the latch release lever 133. For example, the first and second legs 166, 168 may pivot around axes defined the attachment between foot 165 and foot 169 and the handle base plate 118, respectively, toward the X-axis when the overhang portion 167 is contacted by the outer door panel 32. As the first and second legs 166, 168 bend 170, the catch end 183 of the catch arm 180 moves in the vehicle longitudinal direction and the vehicle lateral direction into the plane of rotation 138 of the latch release lever 133. When the catch end 183 enters the plane of rotation 138 of the latch release lever 133, the cutout 184 of the catch end 183 catches the latch release lever 133 and inhibits movement of the latch release lever 133 through its plane of rotation 138 to an unlatched position, thereby inhibiting movement of the door latch assembly 100 from a latched configuration to an unlatched configuration during the side impact.

It should now be understood that embodiments disclosed herein provide a latch release lever blocking structure that is configured to move into a plane of rotation of a latch release lever a door latch assembly under certain side impact conditions to prevent unintentional unlatching of a vehicle door. For example, under normal operating conditions the latch release lever blocking structure is spaced from the plane of rotation of the latch release lever, to allow operation of the latch release lever. Upon application of a predetermined force from a side impact, the latch release lever blocking structure moves longitudinally into the plane of rotation of the latch release lever to prevent the latch release lever from unlatching the vehicle door.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A door latch assembly operable to latch and unlatch a vehicle door assembly, the door latch assembly comprising:
    a door handle;
    a latch release lever operatively coupled to the door handle and having a plane of rotation, wherein rotation of the door handle causes the latch release lever to travel through the plane of rotation in a vehicle longitudinal direction to unlatch the vehicle door assembly; and
    a latch release lever blocking structure operable to block rotation of the latch release lever through the plane of rotation, the latch release lever blocking structure comprising;
        a bracket body; and
        a catch arm extending from the bracket body to a catch end along the vehicle longitudinal direction, wherein the latch release lever blocking structure is longitudinally spaced from the plane of rotation of the latch release lever during normal operating conditions, and the latch release lever blocking structure deforms in the vehicle longitudinal direction when acted upon by an impact force such that the catch arm longitudinally moves into the plane of rotation of the latch release lever and the catch end catches the latch release lever at a location spaced from the bracket body to prevent the latch release lever from rotating to an unlatched position.

2. The door latch assembly of claim 1 further comprising a handle base plate, wherein:
    the door handle is rotatively coupled to the handle base plate:
    the latch release lever is rotatively supported on the handle base plate; and
    the bracket body of the latch release lever blocking structure is coupled to the handle base plate proximate to the plane of rotation of the latch release lever.

3. The door latch assembly of claim 2, wherein the latch release lever blocking structure comprises:
    a first leg coupled to the handle base plate;
    a second leg coupled to the handle base plate and longitudinally spaced from the first leg; and
    an overhang portion bridging a distance between the first leg and the second leg, wherein the overhang portion is spaced apart from the handle base plate in a vehicle lateral direction.

4. The door latch assembly of claim 3, wherein the catch arm extends from one of the first leg and the second leg in the vehicle longitudinal direction.

5. The door latch assembly of claim 3, wherein the catch arm is coupled to the overhang portion and extends in the vehicle longitudinal direction beyond one of the first leg and the second leg.

6. The door latch assembly of claim 1, wherein the bracket body spaces the catch arm in a vehicle lateral direction beyond the plane of rotation of the latch release lever during the normal operating conditions.

7. The door latch assembly of claim 1 wherein the catch end comprises a cutout configured to receive the latch release lever therein when the impact force causes the catch arm to move into the plane of rotation of the latch release lever.

8. The door latch assembly of claim 1, wherein the catch arm is longitudinally spaced from the plane of rotation during normal operating conditions.

9. A vehicle door assembly comprising:
    an outer door panel; and
    a door latch assembly operable to latch and unlatch the vehicle door assembly, wherein the door latch assembly comprises:
        a door handle assembly comprising a door handle;
        a latch release lever operatively coupled to the door handle and having a plane of rotation, wherein rotation of the door handle causes the latch release lever to travel through the plane of rotation in a vehicle longitudinal direction to unlatch the vehicle door assembly; and
        a latch release lever blocking structure positioned inboard of the outer door panel and operable to block rotation of the latch release lever through the plane of rotation, the latch release lever blocking structure comprising;
            a bracket body; and
            a catch arm extending from the bracket body to a catch end along the vehicle longitudinal direction, wherein the latch release lever blocking structure is longitudinally spaced from the plane of rotation of the latch release lever during normal operating conditions, and the latch release lever blocking structure deforms in the vehicle longitudinal direction when acted upon by an impact force such that the catch arm longitudinally moves into the plane of rotation of the latch release lever and the catch end catches the latch release lever at a location spaced from the bracket body to prevent the latch release lever from rotating to an unlatched position.

10. The vehicle door assembly of claim 9 further comprising a handle base plate, wherein:

the door handle is rotatively coupled to the handle base plate:

the latch release lever is rotatively supported on the handle base plate; and the bracket body of the latch release lever blocking structure is coupled to the handle base plate proximate to the plane of rotation of the latch release lever.

11. The vehicle door assembly of claim 10, wherein the latch release lever blocking structure comprises:

a first leg coupled to the handle base plate;

a second leg coupled to the handle base plate and longitudinally spaced from the first leg; and an overhang portion bridging a distance between the first leg and the second leg wherein the overhang portion is spaced apart from the handle base plate in a vehicle lateral direction from the handle base plate.

12. The vehicle door assembly of claim 11, wherein the catch arm extends from one of the first leg and the second leg in the vehicle longitudinal direction.

13. The vehicle door assembly of claim 11, wherein the catch arm is coupled to the overhang portion and extends in the vehicle longitudinal direction beyond one of the first leg and the second leg.

14. The vehicle door assembly of claim 9, wherein the bracket body spaces the catch arm in a vehicle lateral direction beyond the plane of rotation of the latch release lever during the normal operating conditions.

15. The vehicle door assembly of claim 9, wherein the catch end comprises a cutout configured to receive the latch release lever therein when the impact force causes the catch arm to move into the plane of rotation of the latch release lever.

16. A vehicle comprising:

a body; and a vehicle door assembly coupled to the body, wherein the vehicle door assembly comprises:

an outer door panel; and a door latch assembly operable to latch and unlatch the vehicle door assembly to the body, wherein the door latch assembly comprises:

a door handle assembly comprising a door handle;

a latch release lever operatively coupled to the door handle and having a plane of rotation, wherein rotation of the door handle causes the latch release lever to travel through the plane of rotation in a vehicle longitudinal direction to unlatch the vehicle door assembly; and a latch release lever blocking structure positioned inboard of the outer door panel and operable to block rotation of the latch release lever through the plane of rotation, the latch release lever blocking structure comprising;

a bracket body; and a catch arm extending from the bracket body to a catch end along the vehicle longitudinal direction of the vehicle, wherein the latch release lever blocking structure is longitudinally spaced from the plane of rotation of the latch release lever during normal operating conditions, and the latch release lever blocking structure deforms in the vehicle longitudinal direction when acted upon by an impact force such that the catch arm longitudinally moves into the plane of rotation of the latch release lever and the catch end catches the latch release lever at a location spaced from the bracket body to prevent the latch release lever from rotating to an unlatched position.

17. The vehicle of claim 16, wherein:

the door handle assembly further comprises a handle base plate to which the door handle is rotatively mounted;

the latch release lever is rotatively supported on the handle base plate; and the bracket body of the latch release lever blocking structure is coupled to the handle base plate proximate to the plane of rotation of the latch release lever.

18. The vehicle of claim 17, wherein the latch release lever blocking structure comprises:

a first leg coupled to the handle base plate;

a second leg coupled to the handle base plate and longitudinally spaced from the first leg; and an overhang portion bridging a distance between the first leg and the second leg wherein the overhang portion is spaced apart from the handle base plate in a vehicle lateral direction.

19. The vehicle of claim 18, wherein the catch arm extends from one of the first leg and the second leg in the vehicle longitudinal direction.

20. The vehicle of claim 18, wherein the catch arm is coupled to the overhang portion and extends in the vehicle longitudinal direction beyond one of the first leg and the second leg.

21. The vehicle of claim 17, wherein the bracket body spaces the catch arm in a vehicle lateral direction beyond the plane of rotation of the latch release lever during the normal operating conditions.

* * * * *

UNITED STATES PATENT AND TRADEMARK OFFICE
CERTIFICATE OF CORRECTION

PATENT NO. : 11,060,326 B2  
APPLICATION NO. : 15/923444  
DATED : July 13, 2021  
INVENTOR(S) : Josh D. Fraley Page 1 of 1

It is certified that error appears in the above-identified patent and that said Letters Patent is hereby corrected as shown below:

On the Title Page

In page 2, Column 1, item (56), U.S. patent documents, cite no. 6, delete "Herline" and insert --Herline et al.--, therefor.

In page 2, Column 2, item (56), U.S. patent documents, cite no. 7, delete "Moriya" and insert --Moriya et al.--, therefor.

In page 2, Column 2, item (56), U.S. patent documents, cite no. 12, delete "Kang" and insert --Kang et al.--, therefor.

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*